(12) United States Patent
Rankin

(10) Patent No.: US 7,841,357 B2
(45) Date of Patent: Nov. 30, 2010

(54) CONNECTION STATE SENSING FOR COUPLING DEVICE

(75) Inventor: William John Rankin, Burnsville, MN (US)

(73) Assignee: Colder Products Company, St. Paul, MN (US)

(*) Notice: Subject to any disclaimer, the term of this patent is extended or adjusted under 35 U.S.C. 154(b) by 825 days.

(21) Appl. No.: 11/685,523

(22) Filed: Mar. 13, 2007

(65) Prior Publication Data

US 2007/0209716 A1    Sep. 13, 2007

Related U.S. Application Data

(60) Provisional application No. 60/743,468, filed on Mar. 13, 2006.

(51) Int. Cl.
*F16K 37/00*    (2006.01)

(52) U.S. Cl. .............. 137/1; 137/554; 251/149.6; 285/93

(58) Field of Classification Search .......... 137/554, 137/614, 614.02, 614.03, 614.04, 1; 251/149.1, 251/149.6; 285/93; 200/61.6
See application file for complete search history.

(56) References Cited

U.S. PATENT DOCUMENTS

| | | | |
|---|---|---|---|
| 2,015,689 A | 10/1935 | Odell | |
| 3,074,670 A * | 1/1963 | Breuning | 285/93 |
| 3,098,500 A * | 7/1963 | Gruber | 137/554 |
| 3,099,211 A | 7/1963 | Vernon, Jr. et al. | |
| 3,846,774 A * | 11/1974 | Thorbard et al. | 137/554 |
| 3,896,280 A | 7/1975 | Blake | |
| 4,213,021 A | 7/1980 | Alexander | |
| 4,241,769 A | 12/1980 | Wiesner | |
| 4,590,963 A * | 5/1986 | Gardner et al. | 137/554 |
| 4,646,784 A | 3/1987 | de Leeuwe | |
| 4,874,015 A * | 10/1989 | Schirmacher | 137/554 |
| 5,014,798 A | 5/1991 | Glynn | |
| 5,040,699 A | 8/1991 | Gangemi | |
| 5,079,943 A | 1/1992 | Custer | |
| 5,187,498 A | 2/1993 | Burger | |
| 5,477,896 A | 12/1995 | Grifols Lucas | |
| 5,690,252 A | 11/1997 | Oleksiewicz et al. | |

(Continued)

FOREIGN PATENT DOCUMENTS

EP    0 517 172 A2    12/1992

(Continued)

OTHER PUBLICATIONS

Honeywell, Linear/Angular/Rotary Displacement Sensors, HMC1501/HMC1512; pp. 1-4; Aug. 2000.

(Continued)

*Primary Examiner*—John Rivell
(74) *Attorney, Agent, or Firm*—Merchant & Gould P.C.

(57) ABSTRACT

A coupling device includes a main body defining a fluid flow passage, and a valve member moveable between an unconnected state and a connected state. The coupling device also includes a magnet coupled to the valve member, and a sensor coupled to the main body, the sensor being configured to sense a change in a magnetic flux of the magnet as the valve member moves between the unconnected state and the connected state to determine a connection state of the coupling device.

16 Claims, 4 Drawing Sheets

U.S. PATENT DOCUMENTS

| | | | |
|---|---|---|---|
| 5,853,244 | A | 12/1998 | Hoff et al. |
| 5,896,898 | A | 4/1999 | Crossdale et al. |
| 6,143,996 | A * | 11/2000 | Skanda ............... 200/61.6 |
| 6,202,711 | B1 | 3/2001 | Martucci et al. |
| 6,325,113 | B1 | 12/2001 | Hathaway et al. |
| 6,649,829 | B2 | 11/2003 | Garber et al. |
| 6,667,444 | B1 | 12/2003 | Armitage et al. |
| 6,670,806 | B2 * | 12/2003 | Wendt et al. ............ 137/554 |
| 2002/0145650 | A1 | 10/2002 | Pan et al. |
| 2002/0170731 | A1 | 11/2002 | Garber et al. |
| 2005/0011556 | A1 * | 1/2005 | Dudzik et al. .......... 137/554 |
| 2005/0127314 | A1 * | 6/2005 | Piehl et al. ............ 137/554 |
| 2006/0207345 | A1 | 9/2006 | Rankin |

FOREIGN PATENT DOCUMENTS

| | | |
|---|---|---|
| GB | 2 040 406 A | 8/1980 |
| GB | 2 370 332 A | 6/2002 |
| JP | 2000-304593 | 11/2000 |
| WO | WO 2005/124712 A2 | 12/2005 |

OTHER PUBLICATIONS

International Search Report mailed Aug. 17, 2007.
Restriction Requirement for U.S. Appl. No. 11/276,890, mailed Jul. 2, 2008.
Office Action for U.S. Appl. No. 11/276,890, mailed Sep. 15, 2008.
Final Office Action for U.S. Appl. No. 11/276,890, mailed May 21, 2009.

* cited by examiner

CONNECTION STATE SENSING FOR COUPLING DEVICE

RELATED APPLICATION

This application claims the benefit of U.S. Patent Provisional Application No. 60/743,468 filed on Mar. 13, 2006, the entirety of which is hereby incorporated by reference.

BACKGROUND

The use of quick connect/disconnect coupling devices to connect two or more fluid flow lines has become prevalent in many industries. For example, quick connect/disconnect coupling devices are used to connect fluid sources to various types of equipment.

In many applications, it is important to verify that various coupling devices are connected so that fluid is delivered through the connections as needed. For example, coupling devices are used in coolant systems to connect sources of coolant to equipment such as sophisticated computer systems. If a coupling device is not fully connected or is accidentally disconnected, the flow of coolant can be stopped, thereby compromising the cooling system for the computer system. This can lead to damage to the computer system. Prior systems for monitoring these connections involve manual inspection of the connections by service personnel.

SUMMARY

Example embodiments disclosed herein relate generally to systems and methods for sensing the connection state of a coupling device.

According to one aspect, a coupling device includes a main body defining a fluid flow passage, and a valve member moveable between an unconnected state and a connected state. The coupling device also includes a magnet coupled to the valve member, and a sensor coupled to the main body, the sensor being configured to sense a change in a magnetic flux of the magnet as the valve member moves between the unconnected state and the connected state to estimate a connection state of the coupling device.

DESCRIPTION OF THE DRAWINGS

Reference will now be made to the accompanying drawings, which are not necessarily drawn to scale, and wherein.

DETAILED DESCRIPTION

Example embodiments disclosed herein relate generally to systems and methods for sensing the connection state of a coupling device. In example embodiments, the coupling device is used to connect a source of fluid to another device, such as processing equipment.

The term "fluid" as used herein includes any substance that can be made to flow. This includes, but is not limited to, liquids, gases, granular or powdered solids, mixtures or emulsions of two or more fluids, suspensions of solids within liquids or gases, etc.

Figure 1:
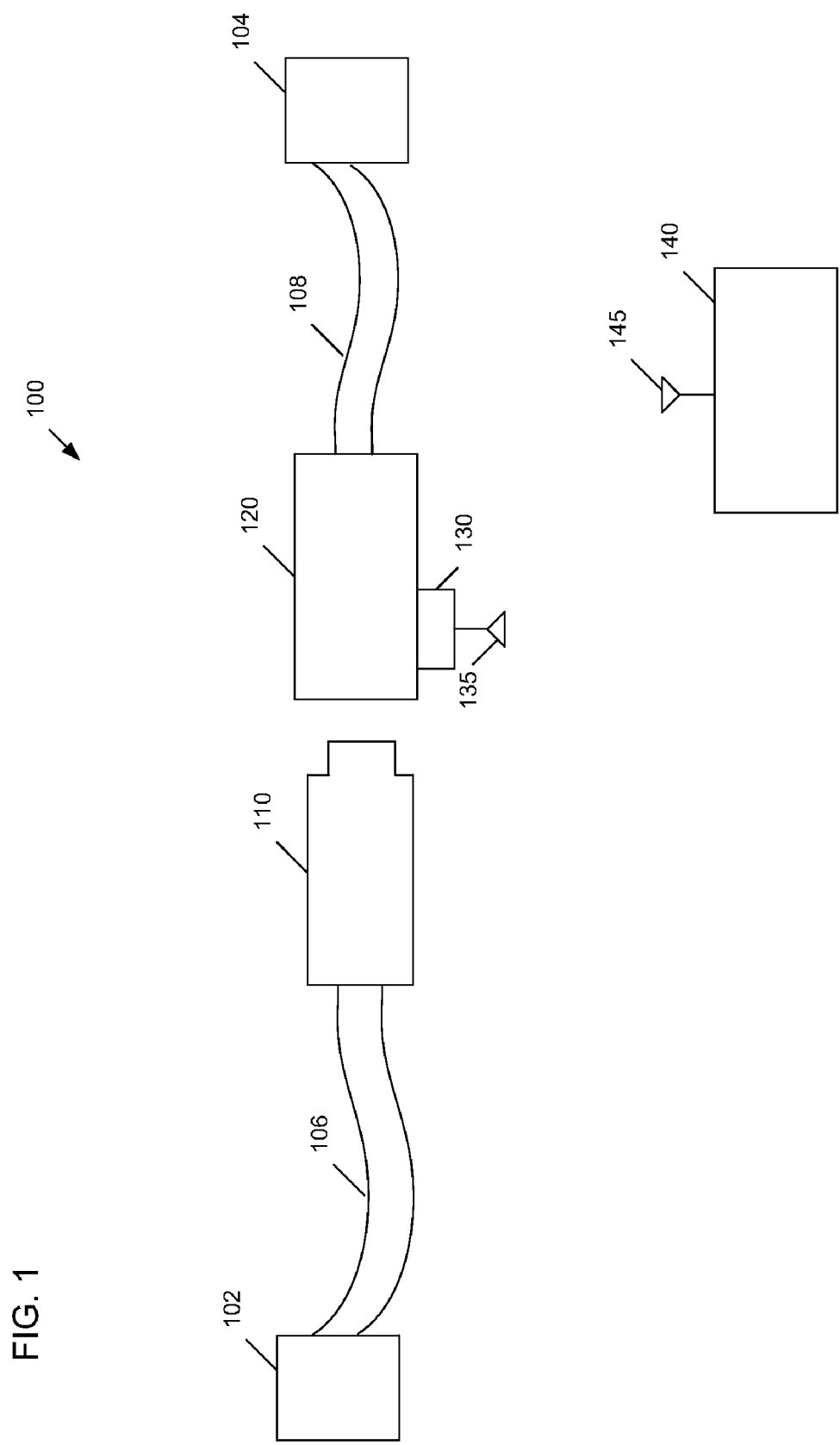
FIG. 1 illustrates an example embodiment of a fluid dispensing system.

Referring now to FIG. 1, an example fluid dispensing system 100 is shown. System 100 includes a fluid source 102 and a piece of processing equipment 104. System 100 also includes a host controller 140.

Fluid from fluid source 102 is delivered to processing equipment 104 through fluid lines 106, 108 and coupling devices 110, 120. Coupling devices 110, 120 are shown in an unconnected state in FIG. 1. When coupling device 110 is mated with coupling device 120 to form a connected state, fluid is transferred from fluid source 102, through fluid line 106, coupling devices 110, 120, and fluid line 108, to equipment 104. Other configurations are possible.

Coupling device 120 includes a sensor 130 programmed to sense a connection state of coupling device 120. For example, in the illustrated embodiment, sensor 130 is programmed to sense whether coupling device 120 is unconnected, partially connected, or fully connected with coupling device 130. In alternative embodiments, sensor 130 can be included on coupling device 110 rather than coupling device 120.

In example embodiments, sensor 130 senses a position of one or more components associated with coupling device 120 to sense the connection state of coupling device 120. For example and as described further below, in one embodiment, sensor 130 can sense a position of a valve member within coupling device 120 to determine the connection state of coupling device 120. In other embodiments, sensor 130 can be programmed to sensor other components to determine the connection state. For example, in one alternative embodiment, sensor 130 is programmed to sense a position of coupling device 110 relative to coupling device 120 to determine the connection state.

In the illustrated example, coupling device 120 includes a transceiver 135 configured to communicate with a transceiver 145 of host controller 140. For example, in one embodiment, sensor 130 of coupling device 120 communicates the connection state of coupling device 120 to host controller 140.

In example embodiments, communication between coupling device 120 and host controller 140 is provided by a two-way serial interface. In one example, communication is provided by a single wire extending between coupling device 120 and host controller 140. In one embodiment, a RS-232 protocol is used to communicate between coupling device 120 and host controller 140. Other possible embodiments include a data transceiver 53 which bi-directionally communicates using wireless protocols such as Bluetooth, IEEE 801.11, Zigbee, or wired protocols such as RS-232, RS-485, Ethernet, or USB. In another possible embodiment, a fiber optic line is used. In wired embodiments, transceivers 135, 145 are replaced with a wired connection.

In one embodiment, host controller 140 is connected, via wired or wireless means, to each coupling device in a multi coupler system. In another possible embodiment, host controller 140 is connected, via wired or wireless means, to one coupling device in a multi coupler system, wherein each coupler is linked to another coupler forming a chain. In another embodiment, a multi-drop protocol, which is known in the art, is used such as, for example, a RS-485 protocol.

Host controller 140 is configured to monitor the connection state of one or more coupling devices, such as coupling device 120. If the connection state of coupling device 120 changes, this change is detected by sensor 130 of coupling device 120 and is communicated by transceiver 135 to host controller 140, and host controller can monitor and provide alerting based on changes in connection state, and/or modify control of system 100 based on the changes in connection state. For example, if coupling device 120 is supposed to be connected to coupling device 110, and coupling device 120 becomes disconnected from coupling device 110, the unconnected state of coupling device 120 is communicated to host controller 140, and host controller 140 can issue an alert, stop the flow of fluid from fluid source 102, and/or stop equipment 104.

Figure 2:
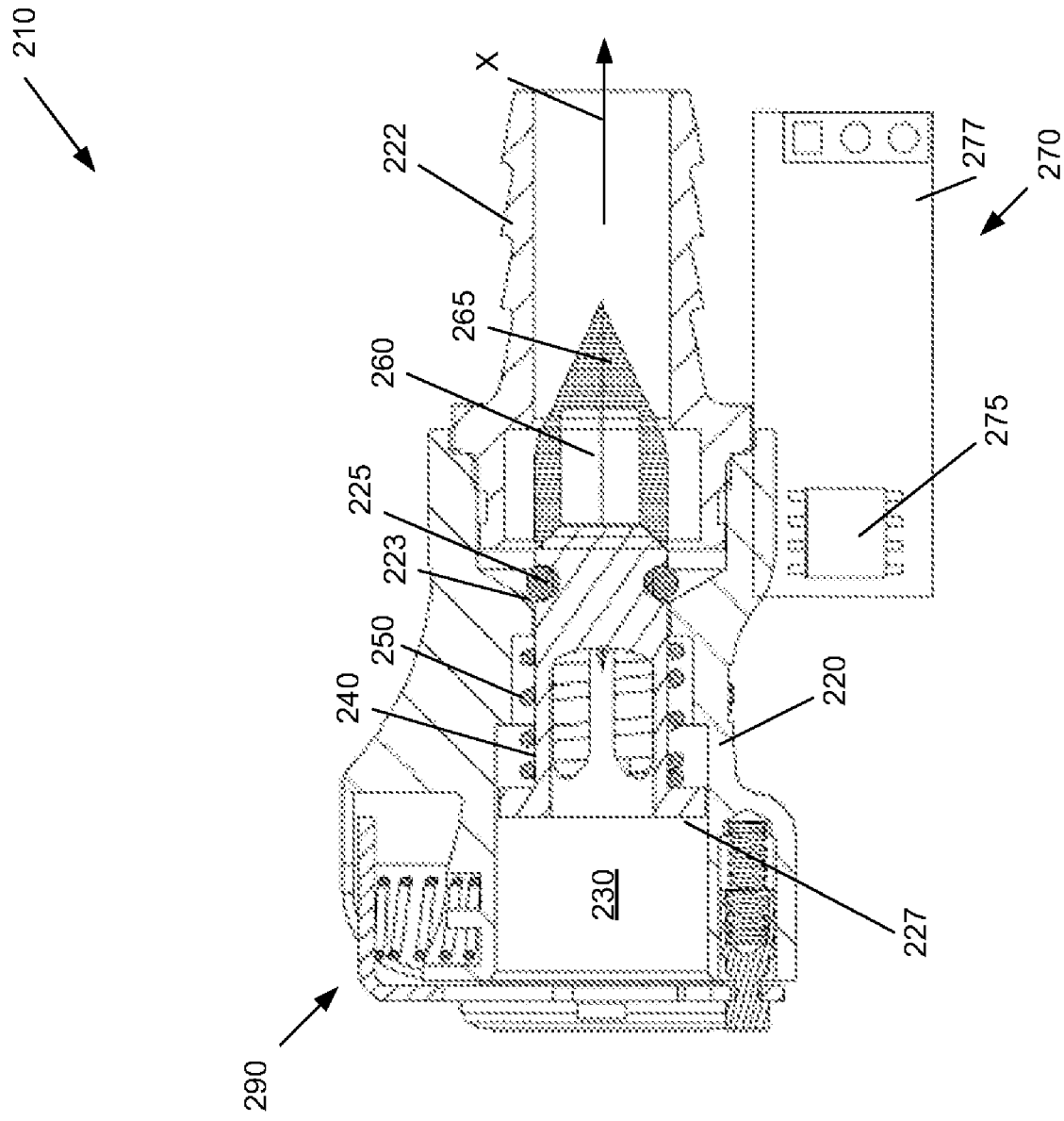
FIG. 2 illustrates a cross-sectional view of an example coupling device.
Figure 3:
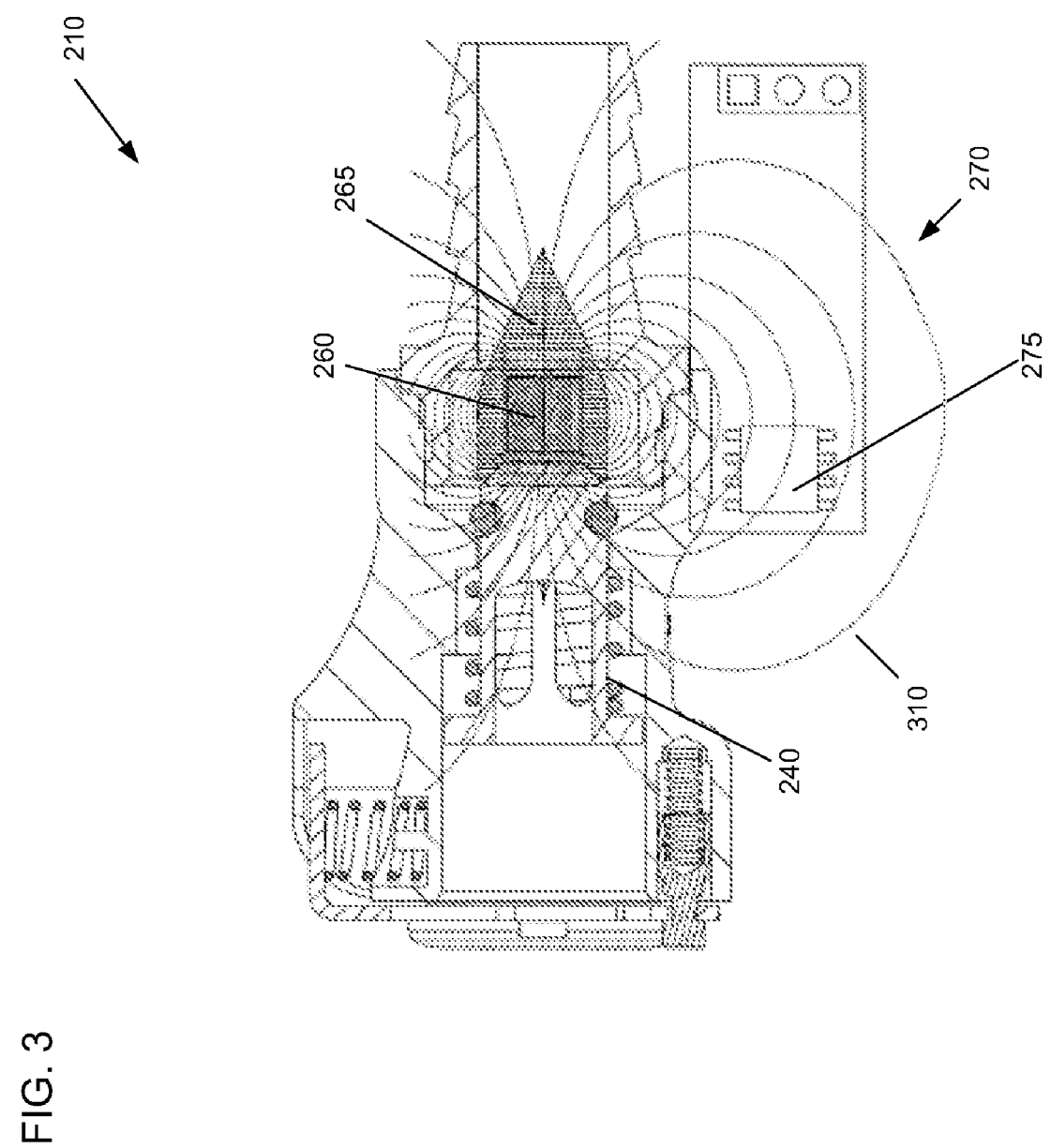
FIG. 3 illustrates another-cross sectional view of the coupling device of FIG. 2.
Figure 4:
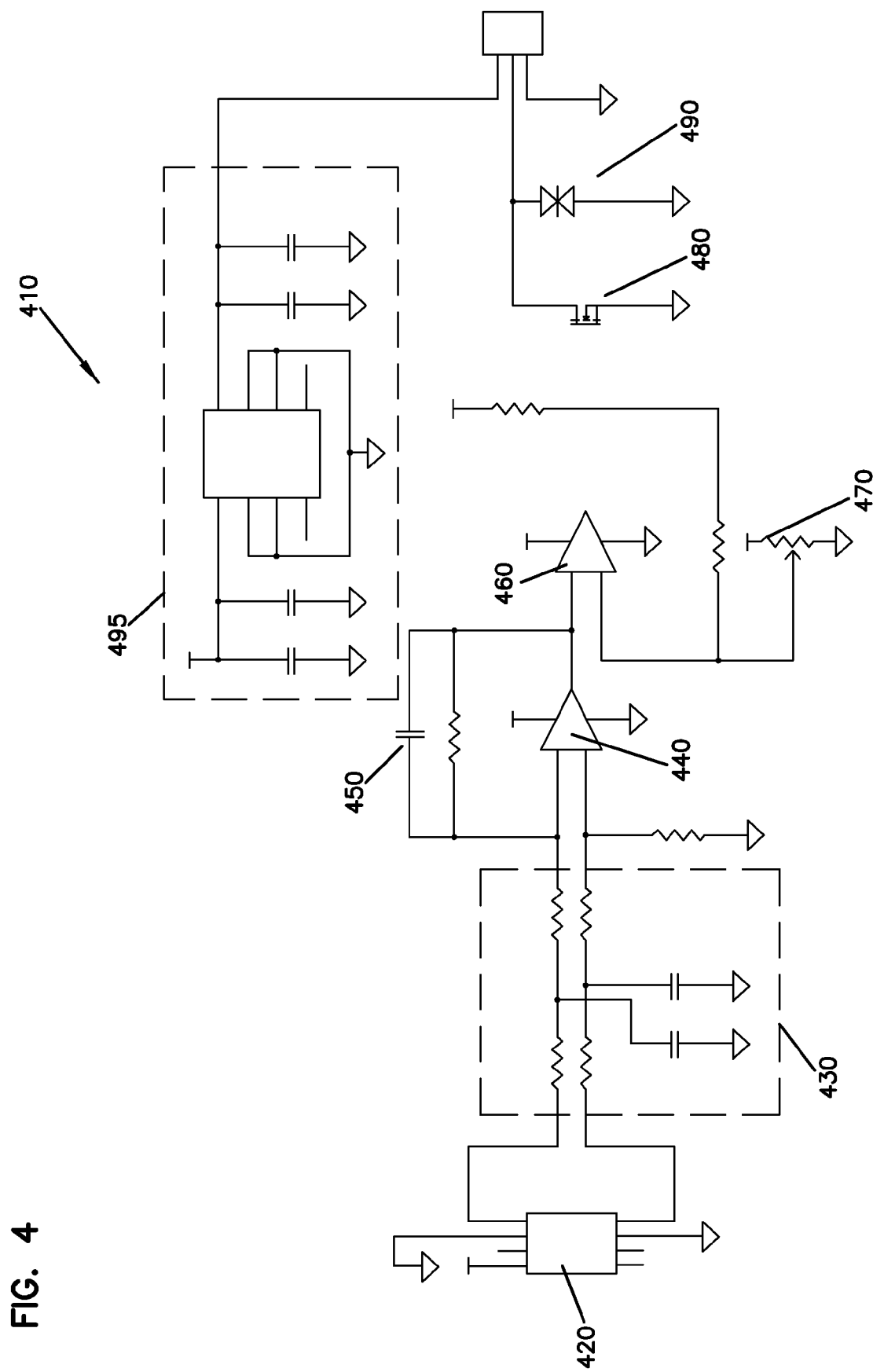
FIG. 4 illustrates an example schematic of a circuit for a sensor assembly.

Referring now to FIGS. 2-4, an example embodiment of a coupling device 210 is shown. Coupling device 210 includes a main body 220 and stem 222 (sometimes referred to as an adapter or termination). Also included is a valve member 240 positioned in a flow passage 230 defined through main body 220 and stem 222. Valve member 240 is biased into a closed position by a spring 250 so that a seal 225 of valve member 240 contacts a shoulder 223 of main body 220 to prevent the flow of fluid through coupling device 210. Other sealing configurations are possible.

Coupling device 210 is shown in an unconnected state in FIG. 2. Valve member 240 moves axially against spring 250 in a direction X when a mating coupling device (e.g., insert) contacts a front surface 227 of valve member 240 during connection. As valve member 240 moves in direction X, seal 225 no longer contacts shoulder 223 of main body 220 and a fluid path is created to allow fluid to flow through flow passage 230 of main body 220 and stem 222. When a mating coupling device is fully connected to coupling device 210, a connected state is defined. An intermediate partially connected state is created as the mating coupling device is inserted into coupling device 210 to partially move valve member 240 in direction X to establish the connected state.

As the mating coupling device is subsequently removed, valve member 240 is biased by spring 250 in a direction opposite to that of direction X until seal 225 contacts shoulder 223 to prevent the flow of fluid through flow passage 230. This is once again the unconnected state.

In the example embodiments, coupling device 210 also includes a position retention device 290 which holds the coupling device 210 in its connected state, and also allows coupling device 210 to be connected and disconnected from a mating coupling device. In some embodiments, device 290 is a quick connect/disconnect assembly such as that disclosed in U.S. Pat. No. 6,649,829 filed on May 21, 2002, which is hereby incorporated by reference.

Stem 222 can be connected to a hose or other conduit extending to a fluid source (e.g., fluid source 102) or other piece of equipment (e.g., equipment 104).

Coupling device 210 also includes a sensor assembly 270 programmed to sense the connection state of coupling device 210. In the example shown, sensor assembly 270 includes a position sensor 275 mounted to a circuit board 277. Generally, position sensor 275 is programmed to sense a position of valve member 240 relative to a position of position sensor 275 to estimate the connection state of coupling device 210. In the embodiment shown, position sensor 275 is a magnetic position sensor such as a displacement sensor with product number HMC1501 manufactured by Honeywell of Plymouth, Minn.

A magnet 265 is incorporated into a rear portion 260 of valve member 240. In the illustrated embodiment, magnet 265 is a permanent magnet made of Neodymium, although other materials can be used. In this configuration, position sensor 275 can sense the change in position of magnet 265 in rear portion 260 of valve member 240 as valve member 240 is moved in direction X to estimate the connection state of coupling device 210.

For example, referring now to FIG. 3, magnet 265 in rear portion 260 of valve member 240 exhibits a magnetic flux 310. Position sensor 275 is programmed to measures the angle of magnetic flux 310 exhibited by magnet 265. As valve member 240 and magnet 265 move in direction X in response to a mating coupling device being connected to coupling device 210, the angle of magnet flux 310 shifts, and position sensor 275 is programmed to sense the change in the angle of magnet flux 310. In example embodiments, position sensor 275 outputs a voltage proportional to the angle of magnetic flux 310 sensed by positioned sensor 275. As described further below, in the illustrated embodiment, the voltage from position sensor 275 is compared to a threshold value to determine the connection state of coupling device 210.

Additional details regarding magnets and sensors that are incorporated into coupling devices can be found in U.S. Patent Provisional Application Ser. No. 60/662,665 filed on Mar. 17, 2005, the entirety of which is hereby incorporated by reference.

Referring now to FIG. 4, a schematic of an example circuit 410 for sensor assembly 270 is shown. Module 420 is the magnetic position sensor. Module 420 provides a voltage on pins 1 and 8 which relates to the angle of the magnetic flux, as sensed from the center of module 420. For example, in one embodiment, the voltage on pins 1 and 8 is proportional to the sine of the angle of the magnetic flux.

The signal from module 420 passes through a filter section 430 to minimize interference from external magnetic fields. An amplifier module 440 amplifies the signal from module 420. Capacitor 450 further filters the signal and stabilizes amplifier module 440. A module 460 is a voltage comparator which compares the voltage output of amplifier module 440 with that of the output of potentiometer 470. Potentiometer 470 is used to set the switching point at which the coupler device is deemed to be in a connected state. The output of module 460 is used to drive a Field Effect Transistor (FET) 480, which serves as the output of circuit 410. A module 490 is used to absorb any transient voltage spikes that may appear on the output. A power supply section 495 forms the power supply for circuit 410.

In example embodiments, circuit 410 is programmed to compare the output of position sensor 275 to a threshold value (see module 460 and potentiometer 470). If the output is less than the threshold value, a determination is made that coupling device 210 is in a disconnected state. If the output is equal to or greater than the threshold value, a determination is made that coupling device 210 is in a connected state. As described above, sensor assembly 270 can be programmed to communicate the connection state of coupling device 210 to a host controller.

In some embodiments, position sensor 275 is programmed to measure changes in the angle of magnetic flux 310 that represent movement of magnet 265 on the order of hundredths, thousandths, or ten-thousandths of an inch. In such embodiments, sensor assembly 270 can be programmed to measure intermediate or partially connected connection states, or to otherwise estimate the position of the valve member. For example, multiple thresholds can be used to indicate unconnected, partially connected, and fully connected connection states. Other configurations are possible. For example, in one alternative embodiment, sensor assembly 270 is programmed to simply communicate the voltage output from position sensor 275 to a host controller, and the host controller can be programmed to estimate the connection state of coupling device 210 based on the voltage output.

In the illustrated embodiment, sensor assembly 270 including position sensor 275 and circuit board 277 are molded into main body 220 of coupling device 210. In alternative embodiments, sensor assembly 270 can be coupled to coupler device 210 in other manners, such as by attaching sensor assembly 270 to coupling device 210 using connectors or adhesives.

In the example shown, magnet 265 is coupled to rear portion 260 of valve member 240, and a cover is formed around magnet 265 to seal magnet 265 within the cover. The cover can be made of one or more materials that are compatible with main body 220, valve member 240, and fluid that flows through coupling device 210. In example embodiments, the cover is made of a polymeric material such as acetal. Other materials can be used.

In the illustrated embodiments, the strength of the magnetic field generated by magnet 265 at position sensor 275 is at least 80 gauss to allow position sensor 275 to work properly. In the example shown, the distance between position sensor 275 and magnet 265 is about 0.400 inch. In alternative embodiments, the distance between position sensor 275 and magnet 265 can be varied depending on the strength and size of the magnet and the type of sensor used. For example, if a larger magnet is used, the distance between the position sensor and the larger magnet can be increased.

By placing sensor 275 within a certain distance of magnet 265 (e.g., 0.400 inch), magnetic flux 310 created by magnet 265 is sufficiently strong to reduce any interference created by magnets in adjacent coupling devices.

In one alternative embodiment, module 460 and potentiometer 470 can be replaced with a microcontroller or microprocessor that can be programmed to estimate the position of the valve. The microcontroller can be programmed to transmit the estimated position to the host controller 140.

In example embodiments, the threshold of the transition from the unconnected to the connected states for circuit 410 can be calibrated during manufacture using a "calibration" insert that is inserted into coupling device 210. The "calibration" insert is generally machined to close tolerances out of a hard and non-magnetic material. An adjustment potentiometer (see potentiometer 470 of FIG. 4) is adjusted so that the output indicates the connected state with the calibration insert in place. Other methods can be used for calibration.

In alternative embodiments, the sensor and/or magnet can be positioned differently. For example, in one alternative embodiment, the magnet can be positioned adjacent an end of the mating coupling device (e.g., insert), and the sensor can be positioned to measure a position of the magnet on the mating coupling device as the mating coupling device is inserted into the coupling device to sense the connection state of the coupling device. Such a configuration can be used, for example, for non-valved coupling devices. Other configurations are possible.

In other alternative embodiments, other types of biasing members can be used in conjunction with and/or in substitution for the spring. For example, in one alternative embodiment, the magnet is used as the biasing member. The magnet is repelled by another magnet positioned on the main body of the coupling device. The repelling forces between the magnets can maintain the valve in the unconnected state until another coupling device is connected to and moves the valve member against the repelling forces to the connected state. Other configurations are possible.

Although a magnet and sensor configured to sense the magnetic flux are used in the examples disclosed herein, in alternative embodiments other types of sensors can be used. For example, in some alternative embodiments, the strength of the magnet field can be measured using hall effect or GMT sensors. In other embodiments, position can be sensed remotely using a magnetic reluctance sensor or an eddy current sensor. In yet other embodiments, non-magnetic systems such as optical means can be used to measure the state of a coupling device using a photo detector and light source. Other alternatives are possible.

In some embodiments, one or more of the coupling devices disclosed herein also include radio frequency identification ("RFID") tags. Such tags carry data which can provide identification for an item in manufacture or in transit, such as consumables in fluid dispensing applications, or any item that requires tracking or identification. Typically, an RFID system includes an antenna or coil, an RFID transceiver, and a transponder or RFID tag. A radio signal emitted by the transceiver antenna activates the RFID tag, allowing it to be read or written to. Antennas are available in a wide variety of shapes and sizes to suit specific applications. Coupling devices employing RFID tags and reader embedded therein have been disclosed in U.S. Pat. No. 6,649,829.

Although the example coupling devices disclosed herein are described as communicating with a host controller, in alternative embodiments, the output of the coupler can include a light on the coupler or processing equipment that is used to warn an operator of the connection state (e.g., a red light on the coupling device can indicate an unconnected state). In other embodiments, the connection state can be indicated through electronic measurement.

In addition, although the example embodiments disclosed herein have been described with respect to coupling devices for fluid transfer, in alternative embodiments the coupling devices disclosed herein can be used in other systems as well. For example, in one alternative embodiment, the coupling devices can be used in mechanical coupling devices with or without fluid transfer. For example, in one embodiment, the coupling device can be used to indicate whether or not the coupling device is mechanically coupled to another device. In yet other embodiments, the coupling devices can be used in electronic coupling devices to indicate whether or not an electronic coupling device is connected to another device.

The various embodiments described above are provided by way of illustration only and should not be construed to be limiting. Those skilled in the art will readily recognize various modifications and changes that may be made to the embodiments described above without departing from the true spirit and scope of the disclosure or the following claims.

What is claimed is:

1. A coupling device, comprising:
   a main body defining a fluid flow passage;
   a valve member moveable between a plurality of connection states including an unconnected state, a partially connected state, and a connected state;
   a magnet coupled to one of the valve member or the main body; and
   a sensor coupled to an other of the valve member or the main body, the sensor configured to estimate a connection state of the coupling device including the unconnected state, the partially connected state, and the connected state by sensing a change in magnetic flux upon valve member displacement.

2. The coupling device of claim 1, wherein the sensor is configured to measure an angle of the magnetic flux to estimate the connection state.

3. The coupling device of claim 1, wherein the sensor is configured to estimate a position of the valve member relative to the main body.

4. The coupling device of claim 1, further comprising a transceiver configured to transmit a signal indicating the connection state of the coupling device.

5. A fluid coupling system, the system comprising:
a first coupling device connected to a source of a fluid; and
a second coupling device connected to a destination of the fluid, the second coupling device including:
  a main body defining a fluid flow passage;
  a valve member moveable between a plurality of connection states including at least an unconnected state, a partially connected state, and a connected state;
  a spring coupled to the valve member, the spring biasing the valve member to a closed position;
  a magnet coupled to the valve member, the magnet encapsulated within a cover comprising a material compatible with the fluid in the source; and
  a sensor coupled to the main body, the sensor configured to estimate a connection state of the coupling device including each of the plurality of connection states by sensing a change in magnetic flux upon valve member displacement;
wherein the first coupling device is connected to the second coupling device so that the valve member is pushed into the main body from the unconnected state to the connected state.

6. The system of claim 5, wherein the sensor is configured to measure an angle of the magnetic flux to estimate the connection state.

7. The system of claim 5, wherein the sensor is configured to estimate a position of the valve member relative to the main body.

8. The system of claim 5, further comprising a transceiver configured to transmit a signal indicating the connection state of the second coupling device.

9. The system of claim 8, further comprising a host controller, wherein the host controller is configured to receive the signal indicating the connection state of the second coupling device, and wherein the host controller controls the fluid flowing from the source based on the connection state of the second coupling device.

10. The system of claim 9, wherein the transceiver transmits the connection state to the host controller using a wired or wireless connection.

11. A method of estimating a connection state of a coupling device, the method comprising:
  positioning an encapsulated magnet on a first component of the coupling device;
  positioning a sensor on a second component of the coupling device;
  allowing the first component to move relative to the second component as the coupling device is connected; and
  estimating the connection state of the coupling device by measuring a change in an angle of a magnetic flux of the magnet.

12. The method of claim 11, further comprising:
  coupling the magnet to a valve of the coupling device; and
  coupling the sensor to a housing of the coupling device.

13. The method of claim 12, wherein the step of estimating further comprises estimating a position of the valve relative to the housing.

14. The method of claim 11, wherein the step of estimating further comprising estimating a plurality of connection states.

15. The method of claim 11, further comprising transmitting the connection state.

16. The method of claim 15, wherein the step of transmitting further comprises transmitting the connection state to a host controller.

* * * * *